United States Patent [19]
Mayo

[11] Patent Number: 5,287,946
[45] Date of Patent: Feb. 22, 1994

[54] CHILD'S PORTABLE CLIMBER

[76] Inventor: Henry C. Mayo, 2634 N. Richmond St., Arlington, Va. 22207

[21] Appl. No.: 906,484

[22] Filed: Jun. 30, 1992

[51] Int. Cl.$^5$ .............................................. E06C 1/00
[52] U.S. Cl. .................................... 182/165; 182/175; 403/315; 403/330
[58] Field of Search ................ 211/198; 182/165, 152, 182/177, 175; 292/44, 45, 49; 24/265 C, 599.1; 403/316, 315, 330, 326, 321; D32/58

[56] References Cited

U.S. PATENT DOCUMENTS

| | | | |
|---|---|---|---|
| 93,551 | 8/1869 | Oakley | 211/198 |
| 1,059,780 | 4/1913 | Starke | 211/198 X |
| 1,599,083 | 9/1926 | Gagne | 211/198 |
| 1,605,506 | 11/1926 | Brunhoff | 211/198 X |
| 1,837,388 | 12/1931 | Wood | 211/198 |
| 2,350,129 | 5/1944 | Richards | 182/175 |
| 2,470,706 | 5/1949 | Larson | 182/175 |
| 2,589,079 | 3/1952 | Heaivilin | 182/175 X |
| 4,544,324 | 10/1985 | Hornung | 403/330 X |

*Primary Examiner*—Blair M. Johnson
*Attorney, Agent, or Firm*—Rodger H. Flagg

[57] ABSTRACT

A child's portable climbing apparatus is disclosed, having first and second climbing members. The first and second climbing members each have spaced, opposing parallel support beams and spaced, horizontal climbing bars secured to the opposing parallel support beams. The first and second climbing members are pivotally joined by a top horizontal climbing bar secured to the beams at a location offset from the longitudinal centerline, to enable the first and second climbing members to be folded into parallel alignment for ease of transportation and storage. At least one safety bar is removably secured between a selected climbing bar on the first climbing member, and a selected climbing bar on the second climbing member to adjustably position and releasably secure the climbing apparatus in a variety of heights and angular climbing positions. A safety catch is preferably used to secure the safety bar during use. A pawl may be positioned to pivot upwardly to allow the selected horizontal climbing bar to enter a slot in the safety bar. Once the climbing bar is positioned in the slot, the pawl pivots to restrict removal of the climbing bar from the slot. To remove the safety bar from the slot, the pawl must be manually raised. Two opposing pawls may be used on each side of the slot.

20 Claims, 4 Drawing Sheets

CHILD'S PORTABLE CLIMBER

BACKGROUND OF THE INVENTION:

Observation of preschool children indicates that they would very likely benefit from play and exercise on a simple, safe climbing apparatus, just as older children benefit from such activity on well known playground and gymnastic equipment. This viewpoint is reinforced by review of manufacturer's literature and inspection of current pre-school and playground equipment. Particular features which appear to be lacking in present equipment include easy foldability and portability, amenability to indoor as well outdoor use, with emphasis on safety considerations. The foldabilty feature is especially important in the home or nursery school with limited space, where a device without this feature would occupy space much needed for other activities at certain periods.

Prior art devices having parallel bars, such as ladders, are taught in U.S. Pat. Nos. 781,898 and 2,350,129. This art is not directed to safe use by young children, because it lacks a safety locking structure. Previous ladder structure, although foldable, does not appear to be designed for use in the home or for use by pre-school children.

The suitability and proportions of the present invention include height adjustments, width, length, spacing between bars, and height of bars off the floor or ground. Safety features include the use of cross support safety bars.

SUMMARY OF THE INVENTION

The present invention is directed to an improved child's portable climbing apparatus wherein a set of spaced, horizonal, parallel climbing bars is supported by beams in an A-frame configuration, having two cross support safety bars. Two safety bars, each have double safety catches at one end configured to connect between opposite parallel bars in the frame structure. The safety bars may be connected to opposite climbing bars of different heights to achieve a variety of climber heights and angular positions commensurate with the age and ability of the children involved. The safety bars may be removed in order to fold the A-frame flat. The safety bars may be inserted between climbing bars in the folded structure to produce a very compact package for transport or storage. The child's portable climbing structure may be fabricated of wood or other material of similar density to provide satisfactory stability of the portable climbing apparatus.

BRIEF DESCRIPTION OF THE DRAWINGS

The above mentioned and other features and objects of this invention and the manner of attaining them will become more apparent and the invention itself will be best understood by reference to the following description of the invention, when considered in conjunction with the accompanying drawings, wherein.

DESCRIPTION OF THE PREFERRED EMBODIMENT

Figure 1:
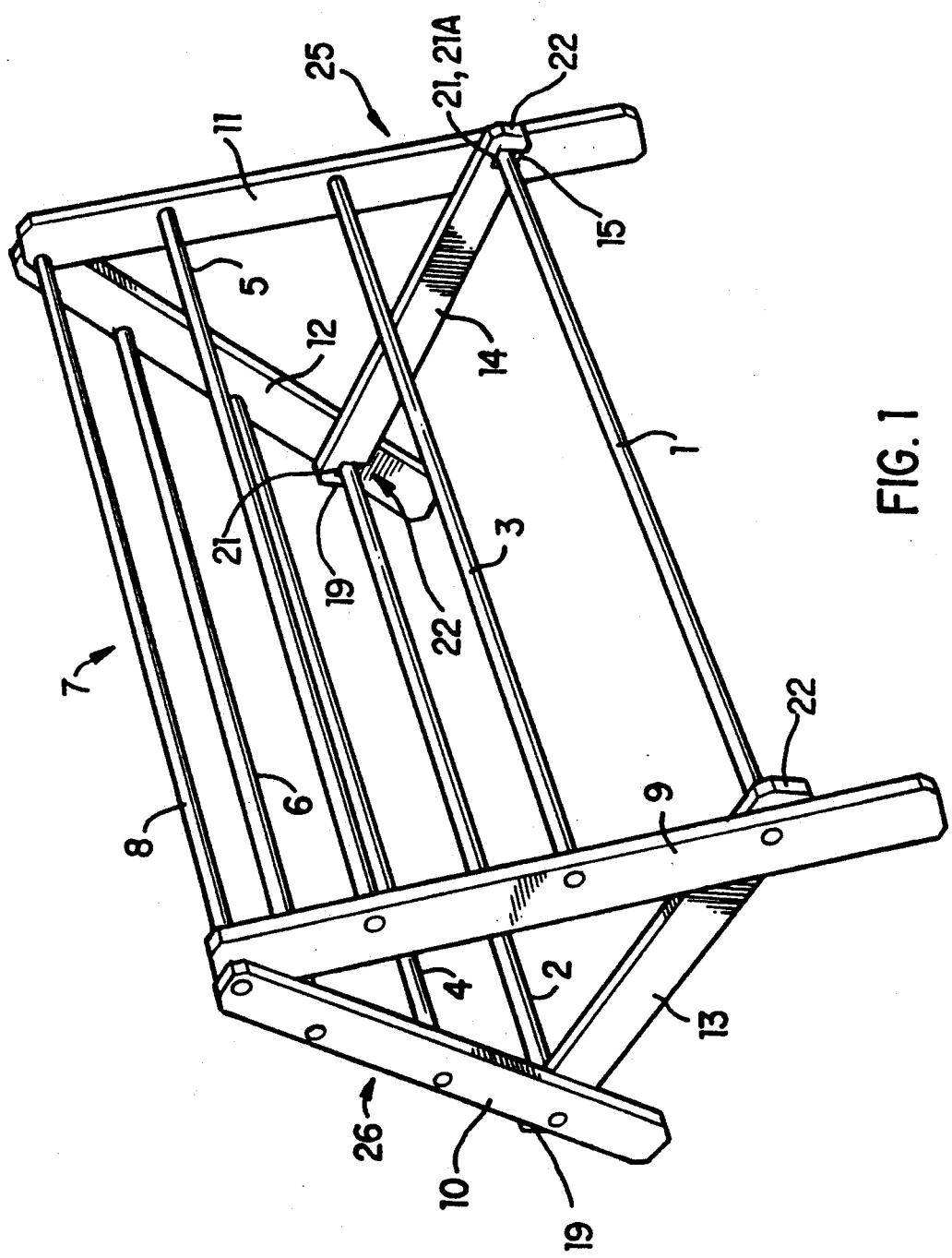
FIG. 1 is a perspective view of the portable climbing apparatus showing the apparatus ready for use.

As shown in perspective in FIG. 1, the child's portable climber assembly 7 comprises a first climbing member 26, having spaced horizontal climbing bars 2, 4, 6. The first climbing member 26 has two support beams 10, 12 which are secured in a spaced opposing parallel configuration with spaced parallel horizontal climbing bars 2, 4, 6 at locations offset from the longitudinal centerline of the inner sides of the beams toward the upper sides of the beams 10, 12 as shown illustrated in FIG. 3. The second climbing member 25 likewise has two opposing support beams 9, 11 secured in a spaced relation to parallel horizonal climbing bars 1, 3, 5. The horizontal climbing bars 1, 3, 5 are offset from the longitudinal centerline of the inner sides of the beams 10, 12 towards the upper sides of the beams 10 and 12.

The sides of the two opposing support beams 9, 11 of the second climbing member 25 are spaced to be closely received within the opposing support beams 10, 12 of the first climbing member 26. A top horizontal climbing bar 8 is secured between the opposing support beams 9, 10, 11 and 12 of the climbing member 25 and 26. The top climbing bar 8 is positioned at locations offset from the longitudinal centerline of the inner sides of the beams 10, 12 and 9, 11 towards the upper sides of the beams 10, 12 and 9, 11 while permitting relative pivotal movement of the climbing members 25, 26.

The support beams 9, 10, 11, 12 and safety bars 13, 14 are preferably of rectangular cross-sectional shape and of wood construction, but may also be of other known structural shapes including square, rectangular, elliptical, channel, circular, etc. Other materials, such as plastic, metal, etc. may be used in whole or in part. The beams 9, 10, 11, 12 and safety bars 13, 14 may be of solid material, or of thin wall construction of a strength sufficient to prevent collapse while safely supporting several users.

The horizontal climbing bars 1, 2, 3, 4, 5, 6, 8 preferably have circular cross sectional shape and are preferably made of wood, but it is within the scope of this disclosure for them to be made of alternate materials and shapes. The horizontal climbing bars may be of solid material or of thin wall construction of a strength sufficient to safely support one or more users.

At least one safety bar 13, 14 is removably secured between a selected climbing bar 1, 3 or 5 on the first climbing member 25 and another selected climbing bar 2, 4 or 6 on the second climbing member. The safety bars 13, 14 may be adjustably positioned to secure the portable climbing apparatus 7 in a variety of heights and angular climbing positions. Each safety bar 13, 14 includes a safety catch 20 as shown in FIG. 2, on at least one end to releasable secure the safety bar 13 or 14 to the selected climbing bar 1, as shown in FIG. 1 and FIG. 2.

The catch 20 has at least one pawl 15 or 16. Preferably, a pair of opposing pawls 15, 16 are pivotally secured in recess 23, 24 adjacent to a slot 21 sized to closely receive on of the climbing bars 2, 4, 6 therein to provide double protection against accidental removal of the safety bars 13, 14 from the climbing bars 2, 4 and 6 during use. The pawls 15, 16 are positioned to pivot upwardly to allow the selected climbing bar 1, as shown in FIG. 1, to enter the slot 21 and to pivot downwardly to prevent removal of the selected climbing bar from the slot 21 without first pivoting the pawls 15, 16. Pins 17, 18 pivotally secure the pawls 15, 16 to the safety bar 13 or 14.

The pawls 15, 16 and pins 17, 18 may be fabricated of wood, plastic or metal or other appropriate material to provide strength, durability and corrosion/weather resistance for reliable and safe operation. The pawls 15, 16 may be of square, rectangular or other shape; and may be of solid or thin wall construction as appropriate. The pawls 15, 16 are normally held in the locked position by the action of gravity where the lower surface of the safety bar 13 is parallel to the lower surface of the respective pawls 15, 16 but other means such as springs (not shown) could also be used.

Figure 2:
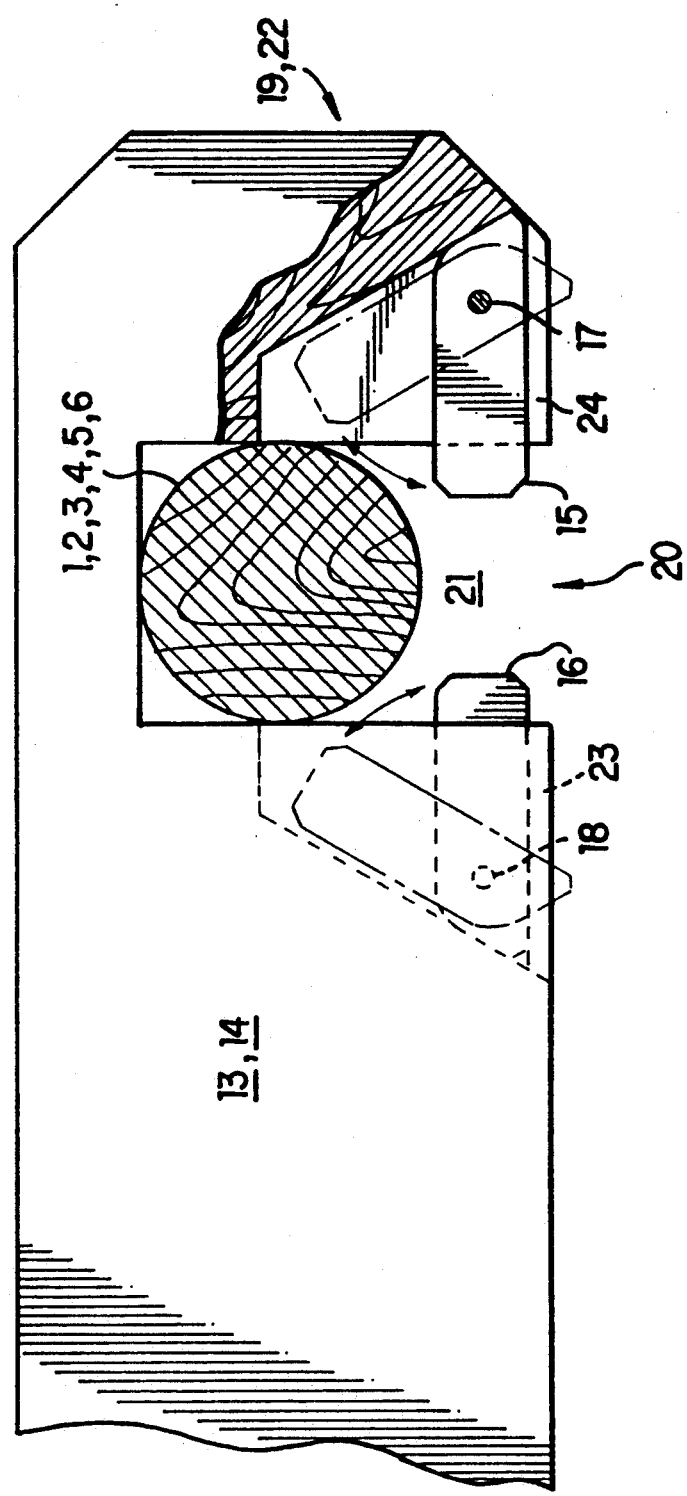
FIG. 2 is a detailed view of one side of the safety catch located at the end of a safety bar, with a cutaway portion showing two safety pawls.

As shown in FIG. 2, the safety pawls 15, 16 are sized to abut a back portion of the slot 19, 21 within the safety bar 13, 14 to restrict movement of the pawls 15, 16 below a position approximately parallel with the bottom of the safety bar 13 and 14. The restricted movement of the pawls 15, 16 may be accomplished by other known structure such as stop screws, (not shown), bottom lips (not shown) on safety bar 13, 14, etc.

In an alternative embodiment depicted in FIG. 1, the safety bars 13, 14 may have a hole 21A at one end to pivotally receive a selected climbing bar 1, 3, 5 and a slot 21 at the other end sized to closely receive a selected climbing bar 2, 4, 6. Stops (not shown) of a suitable configuration may be used to prevent sliding movement of the safety bar 13, 14 along the selected climbing bars 1, 2, 3, 4, 5, 6 may be installed on the climbing bars 1, 2, 3, 4, 5, 6 near the intersection of the climbing bars 1 and 2 and the support beams 9, 10, 11, 12 in order to restrain the safety bar 13, 14 between the stop (not shown) and the support beams 9, 10, 11, 12.

The safety catch 20 may include other engaging-/disengaging mechanisms (not shown) suitable for selectively locking and releasing the safety bar 13, 14 to the selected climbing bars 1, 2, 3, 4, 5, 6. Such engaging-/disengaging mechanisms may include spring loaded mechanisms, sliding mechanisms, screw-on or bolt-on mechanisms, pivoting plate mechanisms, U-bolts, clips, etc.

It is to be understood that the methods and hardware used for rigidly connecting the climbing bars 1, 2, 3, 4, 5, 6 and top bar 8 to the support beams 9, 10, 11, 12 may include glue, epoxy, snap fittings, screws, pins, dowels, bolts and the like.

The lower ends of the support beams 9, 10, 11, 12 which contact the floor, ground or other surface in use, may be provided with anti-skid means such as corrugated surface, rubber pads, etc. The anti-skid means may be secured by any conventional means such as adhesive, screws etc. Any of the connections and assembly of components of the child's portable climber 7 may also include the use of such devices as washers, bushings, sleeves, pins, dowels etc commonly used in this art.

The exposed surfaces of the child's portable climber 7 are preferably smooth, free of splinters, sharp corners, protrusions, pinch points etc. A suitable non-toxic finish coating such as stain, paint, varnish, oil, lacquer etc., may be used. Preferably, the exposed surfaces have a finish suitable for safe use and practice.

In use, the portable climber assembly 7 is removed from the shipping box or package (not shown). The climbing members 25 and 26 are pivotally rotated about the top bar 8, and the safety bars 13, 14 with associated catches 20 are installed on selected climbing bars, 1 and 2, to form a free standing A-frame structure 7. The portable climber assembly 7 may then be adjusted into a configuration commensurate with the abilities of the children exercising at a given time.

The depiction of the climber in FIG. 1 shows the climber at it's highest height setting of the top bar 8. This height position would be most suitable for older children. The climber may be adjusted in several positions of height as desired, possibly for younger children, by altering the connective locations of the safety bars 13, 14 in relation to selected climbing bars 1, 2, 3, 4, 5, 6. The height of the portable climbing assembly 7 may be adjusted by attaching the ends 19, 22 of the safety bars 13, 14 to the climbing bar 4 while the pivoting ends of the safety bars 13, 14 (for example 20) remain engaged to climbing bar 1. A lower height of the portable climbing apparatus 7 may be attained in similar fashion by connecting the catch ends 19, 22 of the safety bars 13, 14 to the climbing bars 1 and 6. Additional height adjustments may be accomplished by altering the attachment location of the safety bars 13, 14 to selected bars 1, 2, 3, 4, 5 or 6 as described above.

Release of catch assembly 20 from bar 1 may be accomplished by pivoting the pawls 15, 16 into the recesses 23, 24 of the catch assembly 20. When the retaining pawls 15, 16 are fully pivoted into recesses 23, 24 the safety bar 13 may be lifted off of climbing bar 1. The safety bar 13 may be selectively attached to suitable bars 1, 3, 5 and 2, 4, 6 to adjustably position the portable climbing apparatus 7.

Figure 3:
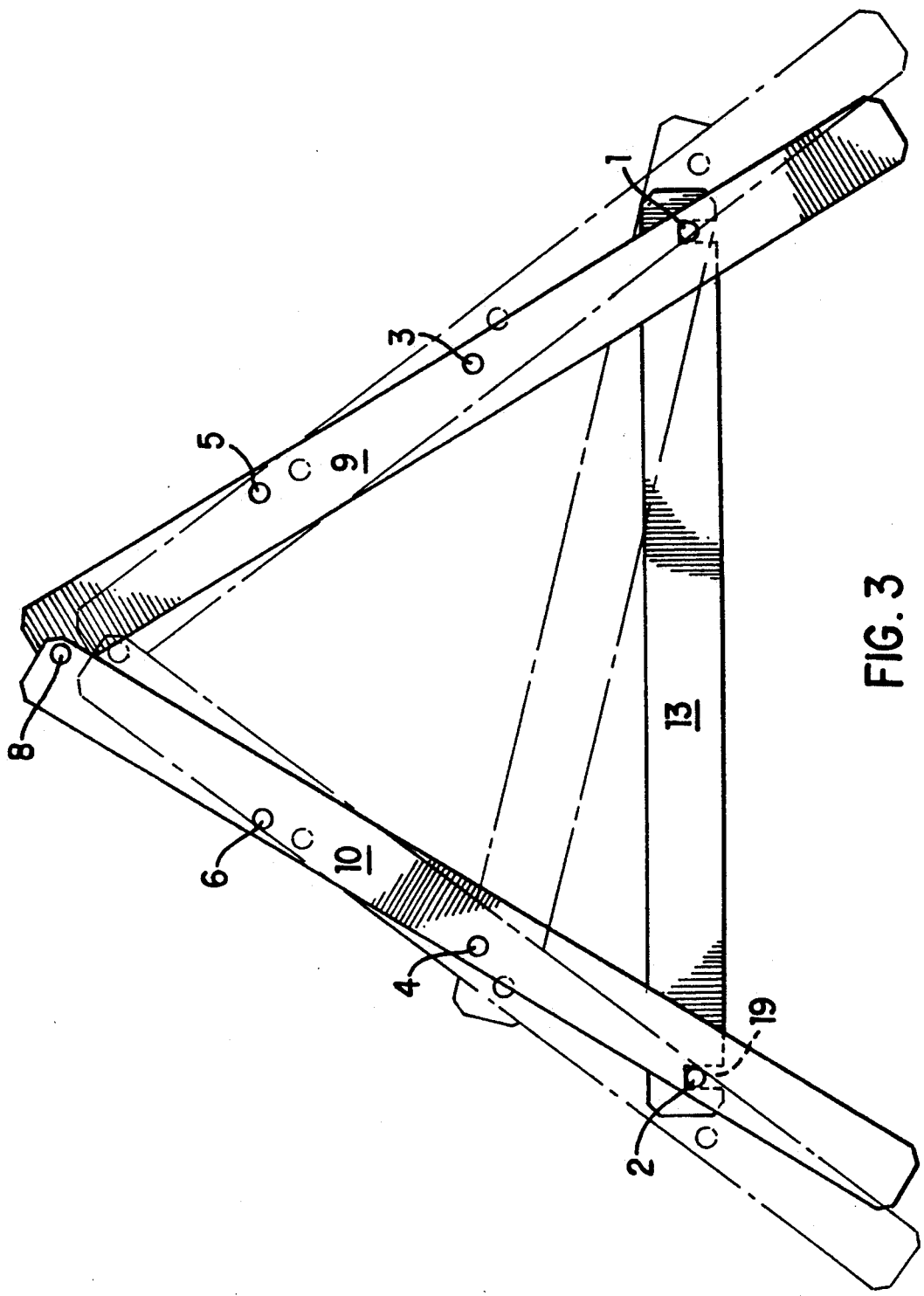
FIG. 3 is side view of the portable climbing apparatus showing the offset locations of the ends of the climbing bars, showing in dotted lines the adjustable relocations of the safety bar.
Figure 4:
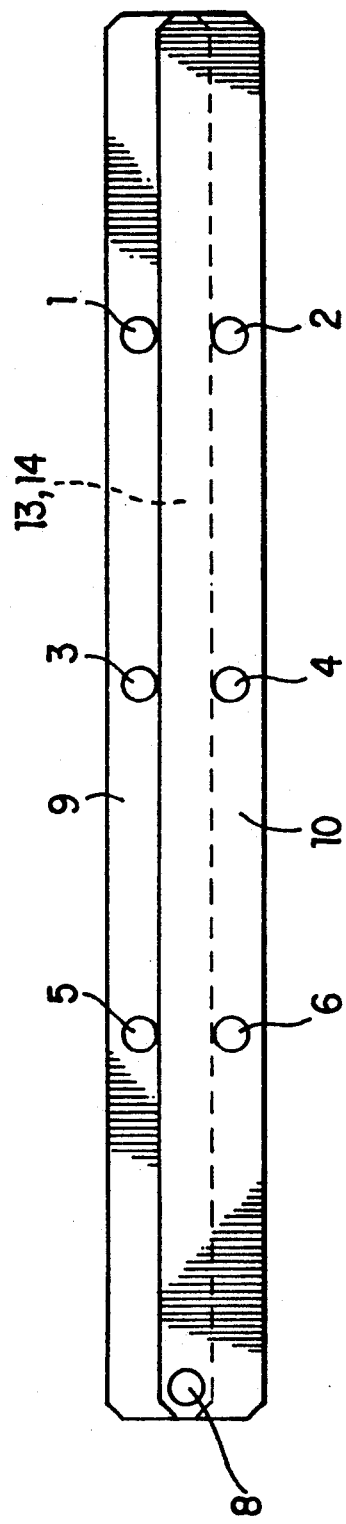
FIG. 4 is a plan view of the portable climbing apparatus in folded-for-storage position, with space indicated by dotted lines for storage of the safety bars between the climbing bars and within the overall space envelop defined by the support beams.

When it is desired to relocate or store the portable climbing apparatus 7, the safety bars 13, 14 may be removed from the climbing bars 1, 3 or 5 and climbing bars 2, 4 or 6 by disengaging the catch assembly 20 as described above. After both safety bars 13, 14 are removed, the support beams 9, 11 are folded toward the support beams 10, 12 by rotation about top bar 8. As illustrated in FIG. 3, the bars 2, 4, 6 and 1, 3, 5 are secured in the support beams 10, 12 and 9, 11 upwardly of the center line of the beams. This arrangement permits folding the beams 10, 12 until they are parallel to beams 9, 11 (e.g., beam 9 is parallel to beam 10) as shown in FIG. 4. In this folded position, beam 9 contacts bars 2, 4 and 6 for compact storage or packing. The safety bars 13, 14 previously removed may be inserted in the space between bars 2, 4, 6 and 1, 3, 5.

Preferred measurements for the child's portable climber, as demonstrated in prototype testing, are 41 and ½ inches from the apex to floor, 40 inches climbing bar length, 12 inches between the climbing bars, 41 inches safety bar length, and 9 inches line-of-center of lower bar to floor. The support beams 9, 10, 11 and 12 and the safety bars 13, 14 may be made of 2×4 studs, and the climbing bars may be made of 1¾ inch diameter rod.

The child's portable climber 7 may be pre-assembled and shipped as a completed assembly to the point of use. Alternatively, the climber 7 may be shipped in modular units, for assembly of the modular units at the point of use.

Thus, while the improved child's portable climber 7 has been fully described and disclosed, numerous modifications will become apparent to one of ordinary skill in this art, and such adaptions and modifications are intended to be included within the scope of the following claims.

I claim:

1. A child's portable climbing apparatus, comprising:
    a first climbing member having spaced, opposing parallel support beams, each of which is identified as having inner and outer sides as well as upper and lower sides; with spaced parallel, horizontal climbing bars secured to the inner sides of the opposing support beams;
    a second climbing member having spaced, opposing, parallel support beams each of which is identified as having inner and outer sides as well as upper and lower sides; with spaced parallel horizontal climbing bars secured to the inner sides of the opposing support beams; and the sides of the opposing support beams of the second climbing member spaced to be closely received within the opposing support beams of the first climbing member;
    a top horizontal climbing bar secured between the opposing support beams of the first and second climbing members permitting relative pivotal movement of at least one of the first and second climbing members about the top horizontal climbing bar;
    at least one safety bar is removably secured between a selected climbing bar on the first climbing member and a selected climbing bar on the second climbing member to adjustably position and releasably secure the climbing apparatus in a variety of heights and angular climbing positions, each safety bar having at least one safety catch comprising two opposing pawls which are pivotally secured adjacent to a slot in the safety bar, to releasably secure the selected climbing bar in the slot during use.

2. The portable climbing apparatus of claim 1, wherein said pawls comprise gravity actuated pawls which are pivotally secured adjacent to a slot sized to closely receive one of the climbing bars therein, and the pawls are positioned to pivot upwardly to allow the selected climbing bar to enter the slot, and to pivot downwardly to prevent removal of the selected climbing bar from the slot without first pivoting the pawls upwardly to clear the climbing bar.

3. The climbing apparatus of claim 1, wherein said pawls are pivotally secured within a recess in the safety bar adjacent to the slot, and the pawls are configured to abut respective back portions of the recess to restrict movement of the pawls below a position approximately parallel with the bottom of the safety bar.

4. The climbing apparatus of claim 1, wherein said two opposing pawls are disposed on each side of the slot to provide double protection against accidental removal of the safety bar from the climbing bars of the first and second side members.

5. The climbing apparatus of claim 1, wherein one side of the safety bar is pivotally secured to a climbing bar on one of the first and second climbing members, and a slot is disposed on the opposite side of the safety bar to selective engage one of the climbing bars on the other one of the first and second side members.

6. The climbing apparatus of claim 1, wherein the offset climbing bars located towards the outer side of the first and second climbing members are positioned in relation to the offset, top climbing bar located towards the inner side of the first and second climbing members to position the climbing apparatus in a folded position wherein the opposing sides of the second climbing member rest against the climbing bars of the first climbing member for ease of transport and storage.

7. The climbing apparatus of claim 1, where in the climbing are cylindrical rods.

8. The climbing apparatus of claim 1, wherein the safety bar is removably secured to a selected climbing bar on each of the first and second members, and the safety bar is sized to be stored between the climbing bars on the first climbing member and the climbing bars on the second climbing member, when the climbing apparatus is in a folded position.

9. The climbing apparatus of claim 1, wherein the opposing supports of the first and second climbing members, the top climbing bar, and the climbing bars on the first and second climbing members are made of wood.

10. The climbing apparatus of claim 1, wherein the safety bar is made of wood.

11. The climbing apparatus of claim 1, wherein the climbing bars of the first climbing member intersect the beams at locations offset from the longitudinal centerline of the inner sides of the beams towards the upper sides of the beams; and the climbing bars of the second climbing member intersect the beams at locations offset from the longitudinal centerline of the inner sides of the beams towards the upper sides of the beams; and the top bar intersects the beams of the first and second climbing members at locations offset from the longitudinal centerline of the inner sides of the beams towards the lower sides of the beams, to provide a compact collapsible child's portable climber.

12. A first climbing member having spaced, opposing parallel support beams each having inner, outer, upper and lower sides; with spaced parallel, horizontal climbing bars secured to the inner sides of the opposing support beams, the climbing bars intersect the beams at locations offset from the longitudinal centerline of the inner sides of the beams towards the upper sides of the beams;
    a second climbing member having spaced, opposing, parallel support beams each having inner, outer, upper and lower sides; with spaced parallel horizontal climbing bars secured to the inner sides of the opposing support beams, the climbing bars intersect the beams at locations offset from the longitudinal centerline of the inner sides of the beams toward the upper sides of the beams; and the sides of the opposing support beams spaced to be closely received within the opposing support beams of the first climbing member;
    a top horizontal climbing bar secured between the opposing support beams of the first and second climbing members, the top bar intersects the beams at a location offset from the longitudinal centerline of the inner sides of the beams toward the lower sides of the beams permitting relative pivotal movement between the climbing members; and
    at least one safety bar removably secured between a selected climbing bar on the first climbing member and a selected climbing bar on the second climbing member to adjustably position and secure the climbing apparatus in a variety of heights and angular climbing positions, the safety bar having at least one gravity actuated safety catch comprising two opposing pawls which are pivotally secured adjacent to a slot in the safety bar, to releasably secure the selected climbing bar in the slot during use.

13. The portable climbing apparatus of claim 12, wherein said pawls are pivotally secured adjacent to the slot sized to closely receive one of the climbing bars therein, and the palws are positioned to pivot upwardly to allow the selected climbing bar to enter the slot, and to pivot downwardly to resist removal of the selected climbing bar from the slot without first pivoting the pawls upwardly to clear the climbing bar.

14. The climbing apparatus of claim 12, wherein the pawls are pivotally secured within a recess in the safety bar adjacent to the slot, and the pawls are sized to abut a back portion of said recess to restrict movement of the pawl below a position approximately parallel with the bottom of the safety bar.

15. The climbing apparatus of claim 12, wherein said two opposing pawls are disposed on each side of the slot to provide double protection against accidental removal of the safety bar from the climbing bars of the first and second members.

16. The climbing apparatus of claim 12, wherein one side of the safety bar is pivotally secured to a climbing bar on one of the first and second climbing members, and a slot is disposed on the opposite side of the safety bar to selectively engage one of the climbing bars on the other one of the first and second members.

17. The climbing apparatus of claim 12, wherein the offset climbing bars located towards the outer side of the first and second climbing members are positioned in relation to the offset, top climbing bar located towards the inner side of the first and second climbing members to position the climbing apparatus in a parallel, folded position, for ease of transport and storage.

18. The climbing apparatus of claim 12, wherein the climbing bars are cylindrical rods.

19. The climbing apparatus of claim 12, wherein the safety bar is removably secured to a selected climbing bar on each of the first and second members, and the safety bar is sized to be stored between the climbing bars on the first climbing member and the climbing bars on the second climbing member, when the climbing apparatus is in a parallel, folded position.

20. The climbing apparatus of claim 12, wherein the climbing bars are cylindrical rods.

* * * * *